United States Patent
Fredinburg et al.

(10) Patent No.: US 9,282,087 B1
(45) Date of Patent: Mar. 8, 2016

(54) SYSTEM AND METHODS FOR REVIEWING USER GENERATED CONTENT AND PROVIDING AUTHORIZATION

(71) Applicant: GOOGLE INC., Mountain View, CA (US)

(72) Inventors: Dan Fredinburg, San Francisco, CA (US); Mario Strasser, Winterthur (CH)

(73) Assignee: GOOGLE INC., Mountain View, CA (US)

( * ) Notice: Subject to any disclaimer, the term of this patent is extended or adjusted under 35 U.S.C. 154(b) by 253 days.

(21) Appl. No.: 13/942,431

(22) Filed: Jul. 15, 2013

(51) Int. Cl.
*H04L 29/06* (2006.01)

(52) U.S. Cl.
CPC .................................... *H04L 63/08* (2013.01)

(58) Field of Classification Search
CPC .................................................. H04L 63/1433
USPC ............................................................ 726/26
See application file for complete search history.

(56) References Cited

U.S. PATENT DOCUMENTS

| | | | |
|---|---|---|---|
| 2002/0052843 A1* | 5/2002 | Canon | 705/41 |
| 2008/0177834 A1* | 7/2008 | Gruhl et al. | 709/204 |
| 2013/0331132 A1* | 12/2013 | Goliszewski | H04W 4/12 455/466 |

* cited by examiner

*Primary Examiner* — Jacob Lipman
(74) *Attorney, Agent, or Firm* — Procopio, Cory, Hargreaves & Savitch LLP

(57) ABSTRACT

Systems and methods for providing authorization of user-generated content are described, including a computer-implemented method for providing content by a first user is provided, including receiving, by one or more computing devices, content from the first user, analyzing context data associated with the content received from the first user, providing the content received from the first user to an authorizer based on a result of the analyzing the context data associated with the content, and providing the content of the first user to a second user in response to receiving an authorization from the authorizer.

20 Claims, 7 Drawing Sheets

SYSTEM AND METHODS FOR REVIEWING USER GENERATED CONTENT AND PROVIDING AUTHORIZATION

BACKGROUND

1. Field

Aspects of the example implementations relate to providing controls for sharing user-generated content, and more specifically, allowing a third party to review and authorize user-generated content prior to sharing.

2. Related Art

Private individuals as wells as public individuals, such as celebrities and politicians, and companies, have increasingly used blogs or other social networks to communicate with the world. However, with increased usage of such social networks to communicate, comes an increased likelihood that something inappropriate or embarrassing may be posted inadvertently or unintentionally. Users of social networks must rely on conscious self-review to avoid embarrassing or inappropriate content from being shared.

SUMMARY

The subject matter discussed herein relates generally to online services and, more particularly, to allowing a user to protect themselves from inadvertent or unintentional sharing of content.

According to an aspect, a computer-implemented method for providing content by a first user is provided, including receiving, by one or more computing devices, content from the first user, analyzing context data associated with the content received from the first user, providing the content received from the first user to an authorizer based on a result of the analyzing the context data associated with the content, and providing the content of the first user to a second user in response to receiving an authorization from the authorizer.

According to another aspect, a non-transitory computer readable medium having stored therein computer executable instructions is provided, the instructions including receiving, by one or more computing devices, content from the first user, analyzing context data associated with the content received from the first user, providing the content received from the first user to an authorizer based on a result of the analyzing the context data associated with the content; and providing the content of the first user to a second user in response to receiving an authorization from the authorizer.

According to another aspect, at least one computing device comprising storage and a processor is provided, the at least one computing device configured to perform receiving, by one or more computing devices, content from the first user, analyzing context data associated with the content received from the first user, providing the content received from the first user to an authorizer based on a result of the analyzing the context data associated with the content, and providing the content of the first user to a second user in response to receiving an authorization from the authorizer.

In addition to a method as described above, the implementations may include a device, a system, and/or a computer-readable medium, but are not limited thereto.

DETAILED DESCRIPTION

Figure 1:
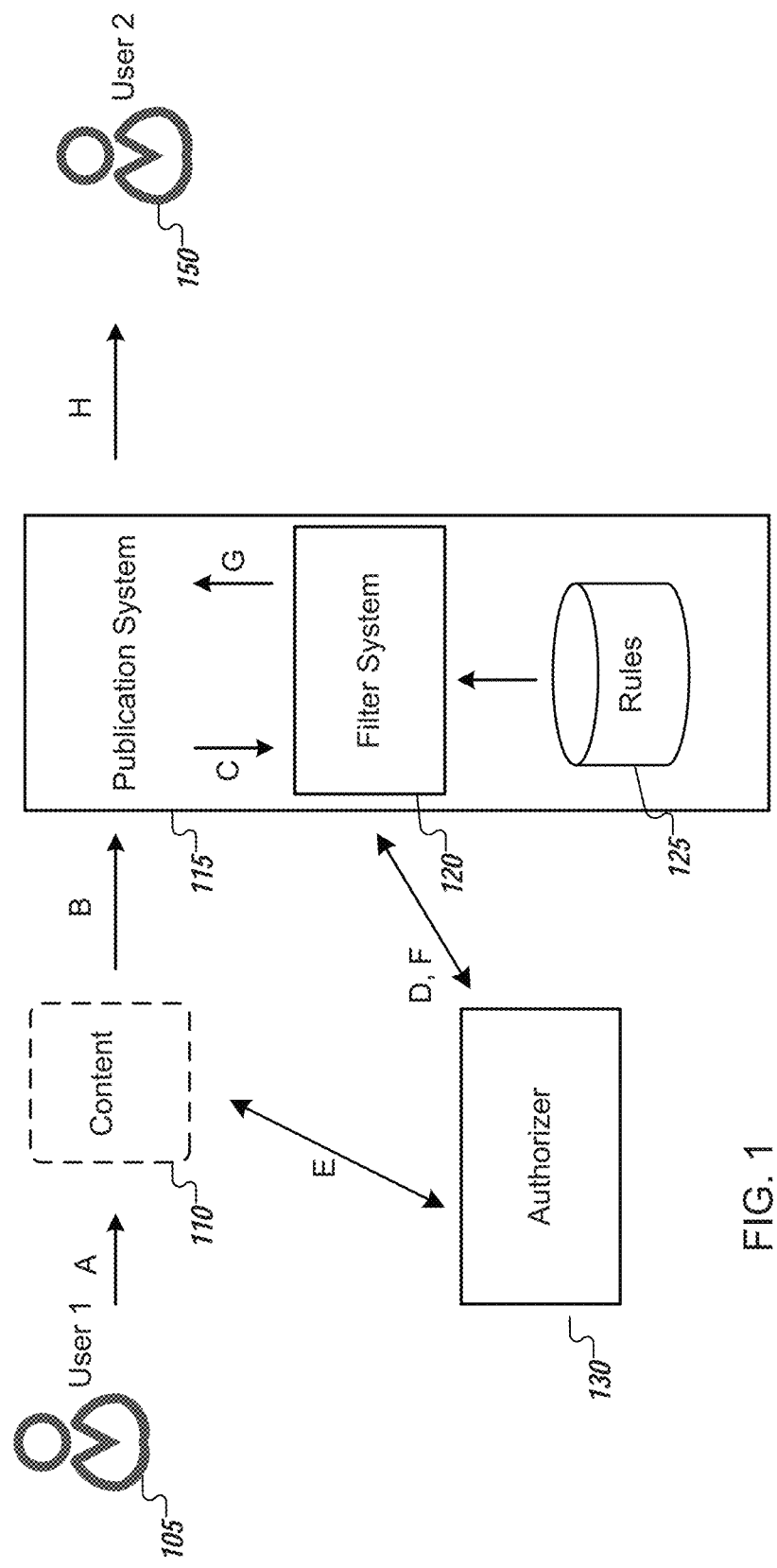
FIG. 1 illustrates a diagram of an example implementation.

The subject matter described herein is taught by way of example implementations. Various details have been omitted for the sake of clarity and to avoid obscuring the subject matter. The examples shown below are directed to structures and functions for filtering content and providing a mechanism to obtain approval of posting from a third party.

Service providers may allow users to generate and share content with other users. Additionally, service providers may also detect the subject matter and/or language of the user content, if the user decides to allow the service provider to perform the detection. In some example implementations, service providers may provide mechanisms to allow a user to optionally define rules to be identify and forward content to an approver prior to distributing to one or more other users based on the subject matter or timing of the posting.

For example, a mechanism may be implemented to allow a Corporate Executive (User A), who chooses to employ the mechanism, to specify that User A's content should be reviewed by User A's attorney prior to being distributed to the one or more shareholders (User B) based on keywords or subjects identified in the content (e.g., Rule 1: "Forward all content relating to 'patents' to my attorney").

In some other example implementations, a Celebrity (User C) who chooses to employ the example implementation may specify that User C's content should be forwarded to User C's Public Relations Manager if posted late at night or early in the morning, prior to being distributed to one or more of User C's fans (User D) (e.g., Rule 2—"Forward all content posted between 11:00 pm and 7:00 am to my agent").

In some example implementations, a user may be given the option and capability to specify to forward all content to an authorizer if biometric data or biological information associated with the user indicates a physical condition. For example, a User E may voluntarily specify that content should be forwarded to a reviewer (such as a public spokesman, attorney, or agent) if biological or biometric information obtained from User E has a biometric level above a certain threshold (e.g., Rule 3—"Forward all content posted when my blood glucose exceeds (greater than; '>') 'X mg/dl' to my spokesman"). Of course, other examples of less than optimal physical conditions could be used instead of blood glucose level, including presence of excessive tiredness, medicines or other substances, abnormal body chemistry, etc. The user may always determine whether he or she wishes to participate in the example implementation.

Additionally, one or more of the above discussed example rules may be combined. For example, a User may choose to specify that all content having a certain subject matter posted late at night should be forwarded to the User's attorney if the biological information indicates a less than optimal physical condition (e.g., Rule 4—"Forward all content relating to my legal proceedings posted after 9:00 pm to my attorney if my blood glucose exceeds (greater than; '>') 'X', indicative of a potential fatigue, as well as a potential physiological measurement of body condition).

FIG. 1 illustrates a diagram of an implementation of the present application. Specifically, FIG. 1 illustrates distribution of content from User 1 (105) to one or more other Users (User 2) 150. As represented by arrow A, User 1 generates new content 110. The new content 110 can include text data, image data, video data, or any other data that User 1 (105) would like to share, distribute or publish to User 2 (150). The content 110 may take the form of an email, a website post, a social media post, blog entry or any other form of content distribution or publication as would be apparent to a person of ordinary skill in the art.

Once the content is generated, the content 110 is submitted to a publication system 115 of the service provider, as represented by arrow B. The submission may take the form of an email, an FTP transfer, an upload via a website, or any other form of data transfer as would be apparent to a person of ordinary skill in the art.

As represented by arrow C, if the user has voluntarily opted to enable filtering, the publication system 115 forwards the content 110 to a filtering system 120 to determine if the content should be published or distributed to one or more other users (User 2) 150. The filter system 120 makes a determination, based on one or more rules 125 defined by User 1 (105), whether the content should be distributed or published immediately or submitted to an authorizer 130 for review prior to publication/distribution. The determination of the filter system is discussed in greater detail below with respect to FIGS. 2-5.

As represented by arrows D and E, if the filter system 120 determines that the content 110 should be reviewed prior to publication/distribution, a message is sent to the authorizer 130 along with a copy of, or link to, the content 120. The rules 125 optionally defined by User 1 (105), may identify a single authorizer 130 for all content, or different authorizers 130 based on the subject matter or other data associated with the content 110.

The rules may be voluntarily created by the user or other party via user interface (e.g., rule generator with drop-down boxes or the like) as would be understood by those skilled in the art. In some implementations, the user may also modify, add, or delete rules after generation, and further, may suspend or terminate operation of the rules, even in the case that another party generates the rules for the user. In some implementations, the user may be prevented from modifying, adding, or deleting rules after generation when the rules were optionally generated by another party other than the user.

As represented by arrow F, after the Authorizer 130 has reviewed the content 110, the Authorizer may issue a reply indicating approval of the content 110, with or without content edits or revisions.

As represented by arrow G, the Filter system 120 forwards the content 110 (with any edits/revisions the Authorizer 130 has provided) to the Publication System 115 for publication distribution. In some example implementations, the filter system 120 may also forward the content 110 to the publication system if a reply from the Authorizer 130 is not received within a time frame specified by User 1 (105) in the Rules 125. Additionally, the user may also override the Filter system 120 and have the content published or distributed without review by the authorizer.

Once the Publication System 115 receives the reply from the Filter system 120, the Publication system 115 distributes or publishes the content 110 (with any edits or revisions included in the reply received from the Filter system 120) to one or more other users (User 2) 150.

Figure 2:
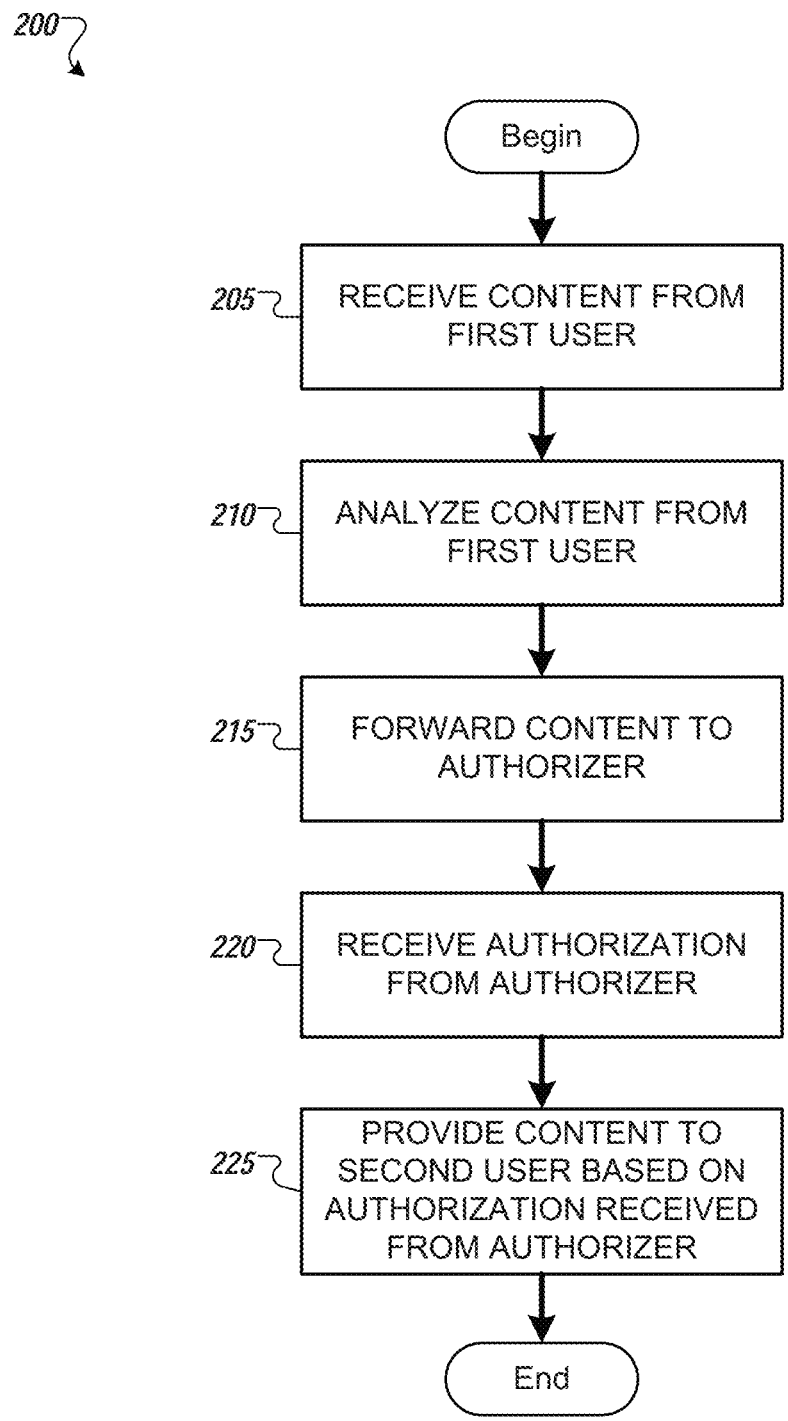
FIGS. 2-4 illustrate process flows according to one or more example implementations.

FIG. 2 illustrates a high level flow diagram of a process 200 for distributing content according to an example implementation. In 205, content is received from a first user (such as User 1 (150) of FIG. 1). The content received from the first user can include text data, image data, video data, or any other data that the first user would like to publish or distribute to other users. The content may be an email, website post, social media post, blog entry or any other form of content distribution or publication as would be apparent to a person of ordinary skill in the art. The content may be received by email, FTP transfer, website upload, or by any other form of data transfer as would be apparent to a person of ordinary skill in the art.

If the first user has opted to enable the filtering functionality, the content received from the first user, is analyzed to determine whether review and approval by an authorizer (such as Authorizer 130) is required prior to publication or distribution to other users in 210. In some example implementations, the analysis is performed based on one or more rules previously defined by the first user. In some implementations, the analysis may alternatively or additionally be performed based on default rules defined by the service provider, or a third party. For example, the first user may be a Chief Executive Officer (CEO) of a company and the rules may be defined by the Public Relations Department, or Legal Department, rather than the CEO. In ether scenario, the user or third party may elect to disable the filtering functionality at any time.

In 215, the content received from the first user may be forwarded to the authorizer based on the analysis of the content in 210 and an authorization or reply may be received from the authorizer in 220 if the first user has enabled the filtering functionality. Example implementations of the content analysis (210), content forwarding (215) and authorization (220) are discussed in greater detail below.

Based on the reply or authorization received from the authorizer, the content is provided (distributed or published) to one or more other users (e.g., second user(s)). Of course, even if the authorizer does not authorize publication or distribution, the first user may override the filtering functionality. The content may be provided either directly to the second user(s) directly, such as via an e-mail, instant message, or other form of direct person to person transfer, or indirectly, such as posted on a website, social media page, etc. accessible by the second user(s). Once the content has been provided to the one or more second users in 225, the process 200 terminates.

Figure 3:
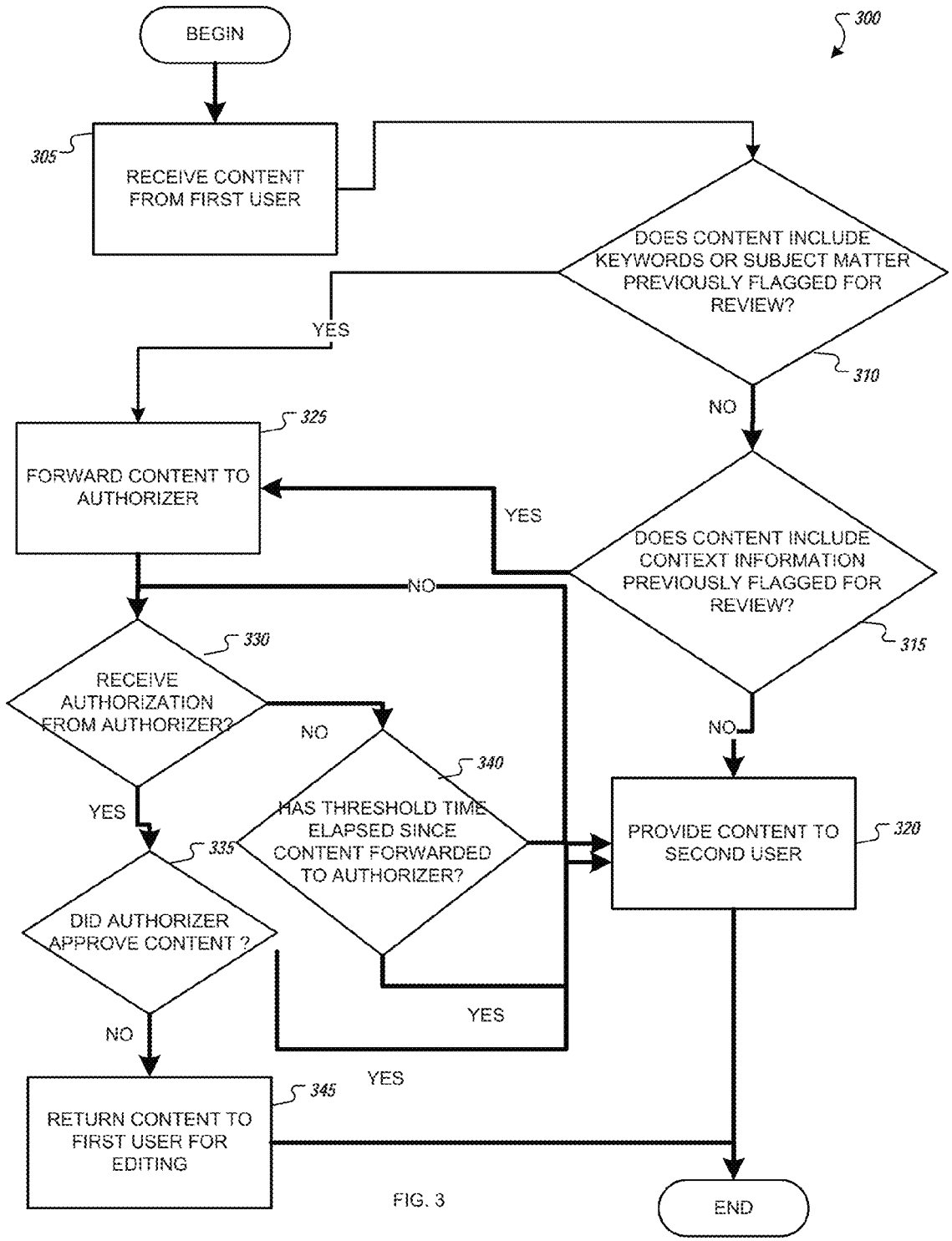

FIG. 3 illustrates a flow diagram of a process 300 of the content analysis (210), content forwarding (215) and authorization (220) of FIG. 2 according to an example implementation.

In the process 300 of FIG. 3, content is received from the first user in 305, which is analogous to 205 of FIG. 2. The content received from the first user can include text data, image data, video data, or any other data that the first user would like to publish or distribute to other users. The content may be an email, website post, social media post, blog entry or any other form of content distribution or publication as would be apparent to a person of ordinary skill in the art. The content may be received by email, FTP transfer, website upload, or by any other form of data transfer as would be apparent to a person of ordinary skill in the art.

Once the content is received from the first user, the content is analyzed in 310 to determine if the content contains keywords, or subject matter that has previously been flagged as requiring review or authorization prior to publication or distribution if the first user has chosen to enable the filtering functionality. The subject matter or keywords contained in the content may be analyzed using image recognition, optical character recognition (OCR) or any other data recognition techniques as would be apparent to a person of ordinary skill in the art.

The determination of content flagged for review may be based on rules created or defined by the first user in some example implementations. Further, the determination of content flagged for review may also be based on rules defined or created by the service provider, or third parties. Additionally, the first user retains the ability to modify, add, delete or override the rules. For example, the first user may be a CEO of a company and the rules may be defined by the Public Relations Department, or Legal Department, rather than the CEO. In the foregoing examples, the rules are generated based on a user authorization.

A user may determine at any time that he or she no longer wishes to employ one or more of the rules, and may provide an indication therefor (e.g., access a user interface to terminate or suspend one or more of the generated rules).

If the content is determined to contain subject matter or keywords previously flagged for review in 310 ("YES"), the content is forwarded to an authorizer for review in 325. The content review by the authorizer is discussed in more detail below.

Conversely, if the content is determined to not contain subject matter or keywords previously flagged for review in 310 ("NO"), the content is analyzed to determine if the content contains context information previously flagged for review in 315. The context analysis in 315 may include analysis of context data associated with the content, including for example, time or date of content generation or target audience, and/or the user's geographic and/or semantic location when generating the content, to determine if the context of the content generation has previously been flagged for review.

For example, if the content has been generated late at night, early in the morning, or on holidays or weekends, the context information may indicate circumstances surrounding the content generation that require review prior to publication or generation. This analysis may be performed based on one or more rules previously defined by one or more of the first user, the service provider, or a third party.

If the context information associated with the content is determined to not include any information previously flagged for review in 315 ("NO"), the content may be provided (e.g., published or distributed) to one or more second users in 320. The content may be provided either directly to the second user(s) directly, such as via an e-mail, instant message, or other form of direct person to person transfer, or indirectly, such as posted on a website, social media page, etc. accessible by the second user(s).

Conversely, if the context information associated with the content is determined to include any information previously flagged for review in 315 ("YES"), the content is forwarded to the authorizer for review in 325. The content may be sent directly to the authorizer, or a message may be sent to the authorizer providing the authorizer with a link that authorizer may use to view the content.

After the content is forwarded to the authorizer in 325, a determination may be made to determine if a reply has been received from the authorizer in 330. If an authorization reply has been received in 330 ("YES"), the process proceeds to 335, where it is determined whether the authorizer has approved the content for distribution or publication. If the authorization reply indicates that the content is approved for publication in 335, the content is provided (published/distributed) to one or more second users in 320.

The review and/or authorization by the authorizer may vary based on situation and usage. For example, in a simple (informal) scenario, the content is provided to the authorizer as is and, is approved or not approved based on the authorizer's subjective decision (e.g., by selecting a respective UI element). In a more complex (formal) scenario, the authorization process might be adapted to an existing (e.g., public relations or legal) review process that specifies certain steps/checks and the content be augmented with additional information based on relevant policies or guidelines. In some implementations, the authorization/review process includes a human authorizer that reviews and makes an authorization decision. In some embodiments, the review and authorization may be performed through an automated process without human intervention based on filtering and authorizing logic including an automated approval (e.g. in case that the filter/rules do not trigger).

In some implementations, the authorization reply may also include edits or revisions of the content that are made by the Authorizer prior to the content being provided to the one or more second users. The content may be provided either directly to the second user(s) directly, such as via an e-mail, instant message, or other form of direct person to person transfer, or indirectly, such as posted on a website, social media page, etc. accessible by the second user(s). Once the content has been provided to the one or more second users in 320, the process 300 terminates.

In some example implementations, the content may be returned to the first user in 345 for editing or revision if the content was not approved by the authorizer in 335 ("NO"). In other words, if the authorizer rejects the content for publication or distribution based on the operations of FIG. 3, the content may be returned to the first user for editing or revision. Once the content has been returned to the first user in 345, the process 300 is ended. Thus, depending on content (e.g. keywords, form), context (e.g. target audience, access restrictions), and configured rules, content is sent to an authorizer for review. Of course the first user may override the authorizer's reply and proceed with publication if the authorizer does not authorize publication.

In some example implementations, if it is determined in 330 that an authorization reply has not been received from the authorizer, a determination may be made whether a threshold amount of time, defined in one or more of the rules, for example, has elapsed since the content was forwarded to the authorizer in 340. If it is determined that the threshold amount of time has not elapsed since the content was forwarded to the authorizer in 340 ("NO"), the process 300 returns to 330 to again determine if an authorization reply has been received.

Conversely, if it is determined that the threshold amount of time has elapsed since the content was forwarded to the authorizer in 340 ("YES"), the content may be provided (published or distributed) to the one or more second users in 320. In other words, if the authorizer does not reply to the content being forwarded within a certain amount of time, the content may be automatically provided (published/distributed) to the one or more second users. Once the content has been provided to the one or more second users in 320, the process 300 terminates.

Figure 4:
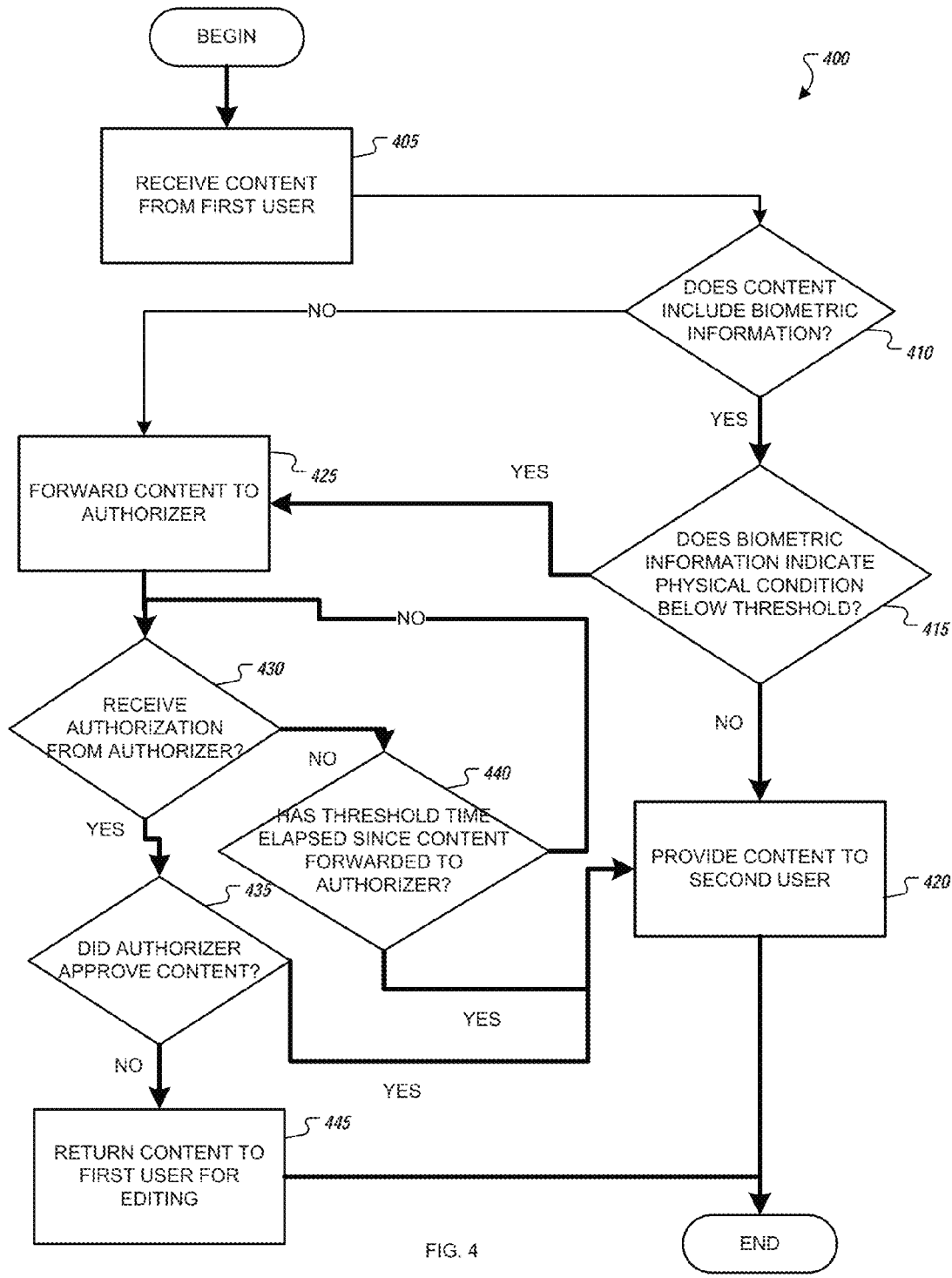

FIG. 4 illustrates a flow diagram of a process 300 of the content analysis (210), content forwarding (215) and authorization (220) of FIG. 2, according to a second example implementation. In this second example implementation, biometric information associated with the content is used to determine whether the content should be reviewed by an Authorizer.

In the process 400 of FIG. 4, content is received from the first user in 405, which is analogous to operation 205 of FIG. 2. The content received from the first user can include text data, image data, video data, or any other data that the first user would like to publish or distribute to other users. The content may be an email, website post, social media post, blog entry or any other form of content distribution or publication as would be apparent to a person of ordinary skill in the art. The content may be received by email, FTP transfer, website upload, or by any other form of data transfer as would be apparent to a person of ordinary skill in the art. Additionally, as explained below, the content may also include biometric information.

Once the content is received from the first user, the content is analyzed in 410 to determine if the content includes biometric data indicating the physiological condition of the user at the time the content was generated if the user has elected to enable the filtering functionality. If the first user determines that he or she wishes to do so, biometric data may be collected at the time the content is captured using one or more sensors communicatively coupled to a device used by the first user to generate the content such that the captured biometric data is associated with the generated content when the content is generated. Biometric data may include, for example, brain activity information, blood chemistry information, blood pressure information, or any other biological information that may be apparent to a person of ordinary skill in the art. Collection of the first user's biometric information as authorized by the first user is discussed in greater detail below with respect to FIG. 5.

In some example implementations, if it is determined in 410 that the content does not include biometric information, the content may be automatically forwarded to the authorizer for review in 420. In other words, if the biometric information used to determine the first user's physiological condition at the time the content was generated is not present, the content may be forwarded to the authorizer for review. Optionally, prior to forwarding to the authorizer (e.g. before operation 425 and after operation 415), operation 310 and operation 315 of FIG. 3 as described may be performed, so as to provide for processing based on keyword and context, as well as biometric information in the content.

Conversely, if biometric information indicating the first user's physiological condition when the content was generated is included in the content, the biometric information is analyzed in 415 to determine whether the first user's physiological condition at the time the content was generated exceeds a certain threshold. As discussed in more detail with respect to FIG. 5 below, in some example implementations, the user's physical condition may be determined by using measured biometric information, such as blood pressure signals, brain wave signals, intravenous measurement signals, etc. and applying a physiological model based on the measured biometric information.

For example, brain wave signals may be used by a physiological model to identify indicators of sleepy brain activity, blood pressure signals may be used by the physiological model to identify indicators of high anxiety, and the intravenous measurements may be used by the physiological model to identify indicators of impairment, fatigue, or other condition that the user might identify as being associated with having content reviewed by the authorizer.

The threshold physiological condition may be specified in one or more rules provided by the first user, the service provider, or a third party. As explained above, the user may terminate or suspend one or more of the rules, e.g., by accessing a user interface.

For example, a first user may set a rule to process postings made while sleepy, highly anxious, or chemically impaired (e.g. "Send Content for review if sleepy, anxious or affected by a blood toxicant"). Optionally, prior to forwarding to the authorizer (e.g. before operation 425 and after operation 415), operation 310 and operation 315 of FIG. 3 as described may be performed, so as to provide for processing based on keyword and context, as well as biometric information in the content.

If the biometric information indicates that the first user had a physical condition that was not below the threshold in 415 ("NO"), the content may be provided (published or distributed) to one or more second users in 420. The content may be provided either directly to the second user(s) directly, such as via an e-mail, instant message, or other form of direct person to person transfer, or indirectly, such as posted on a website, social media page, etc. accessible by the second user(s).

Conversely, if the biometric information indicates that the first user had a physical condition that was below the threshold in 415 ("YES"), the content is forwarded to the authorizer for review in 425. The content may be sent directly to the authorizer, or a message may be sent to the authorizer providing the authorizer with a link that authorizer may use to view the content.

After the content is forwarded to the authorizer in 425, a determination may be made to determine if a reply has been received from the authorizer in 430. If an authorization reply has been received in 430 ("YES"), the process proceeds to 435, where it is determined whether the authorizer has approved the content for distribution or publication. If the authorization reply indicates that the content is approved for publication in 435, the content is provided (published/distributed) to one or more second users in 420.

In some example implementations, the authorization reply may also include edits or revisions of the content that are made by the authorizer prior to the content being provided to the one or more second users. The content may be provided either directly to the second user(s) directly, such as via an e-mail, instant message, or other form of direct person to person transfer, or indirectly, such as posted on a website, social media page, etc. accessible by the second user(s). Once the content has been provided to the one or more second users in 420, the process 400 terminates.

In some example implementations, the content may be returned to the first user in 445 for editing or revision if the content was not approved by the authorizer in 435 ("NO"). In other words, if the authorizer rejects the content for publication or distribution, the content may be returned to the first user for editing or revision. Once the content has been returned to the first user in 445, the process 400 is ended. Depending on content (e.g., keywords, form), context (e.g. target audience, access restrictions), and configured rules, content is sent to an authorizer for review. Of course the first user may override the authorizer's reply and proceed with publication if the authorizer does not authorize publication.

In some implementations, if it is determined in 430 that an authorization reply has not been received from the authorizer, a determination may be made whether a threshold amount of time, defined in one or more of the rules, for example, has elapsed since the content was forwarded to the authorizer in 440. If it is determined that the threshold amount of time has not elapsed since the content was forwarded to the authorizer in 440 ("NO"), the process 400 returns to 430 to again determine if an authorization reply has been received.

Conversely, if it is determined that the threshold amount of time has elapsed since the content was forwarded to the authorizer in 440 ("YES"), the content may be provided (published or distributed) to the one or more second users in 420. In other words, if the authorizer does not reply to the content being forwarded within a certain amount of time, the content may be automatically provided (published/distributed) to the one or more second users. Once the content has been provided to the one or more second users in 420, the process 400 terminates.

Figure 5:
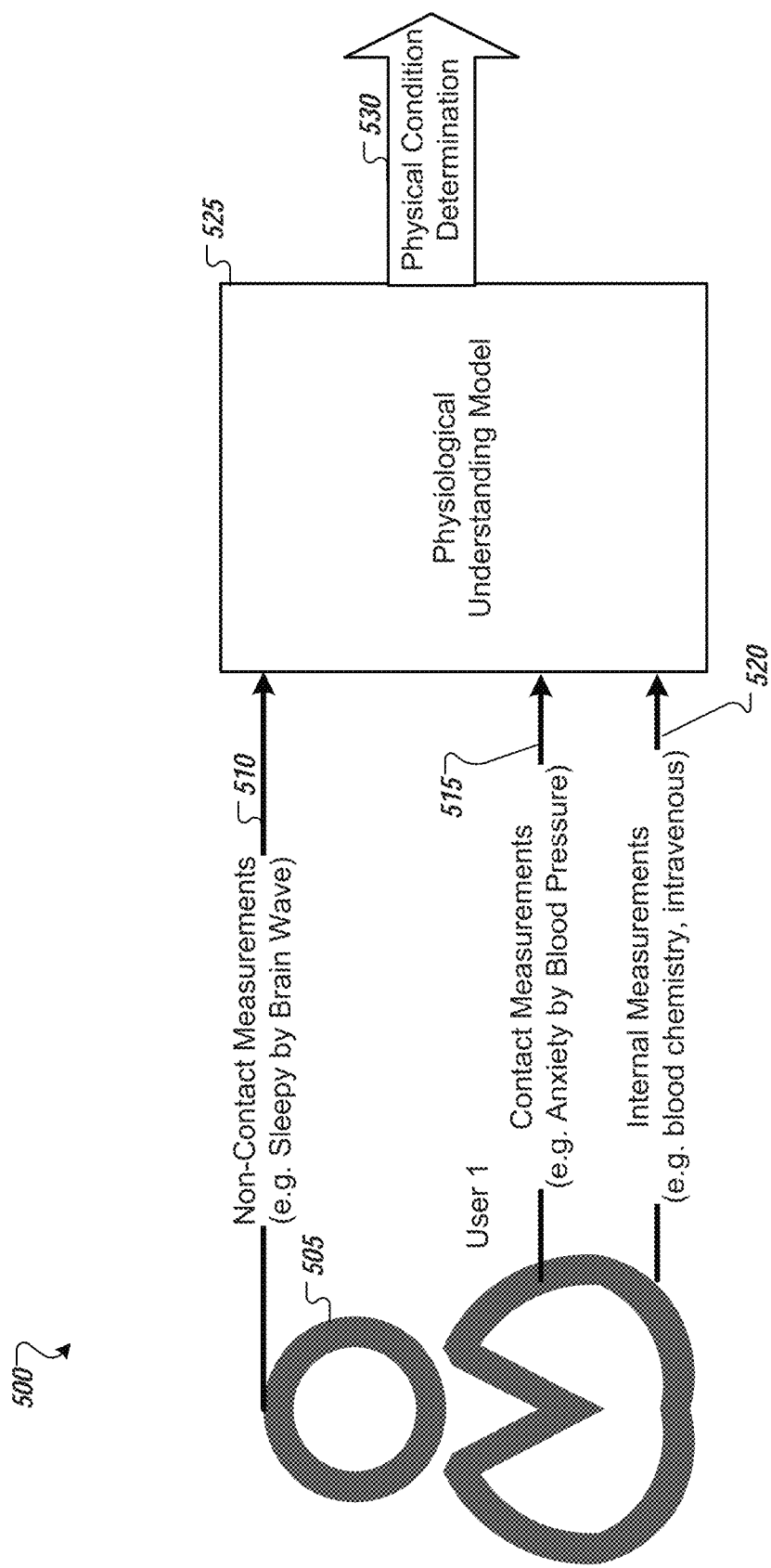
FIG. 5 illustrates a diagram of a physical condition determination of a user according to one or more example implementations.

FIG. 5 illustrates a diagram of a process 500 for making a physical condition determination of a user according to one or more example implementation. More specifically, FIG. 5 illustrates one example of a process of determining a user's physical condition based on biometric information, which may be used to determine whether a first user's physical condition is below a threshold, as discussed in 415 of process 400. One or more sensors may be attached or located proximate to the first user 505. These one or more sensors may be configured to capture biometric signals 510, 515, 520 representative of biometric information of the first user.

For example, signal 510 may be a signal that is sensed by an external sensor that does not contact the body (e.g., a sensed brain wave signal representative of the first user's brain waves, which may be used to identify brain activity indicators such as excessive sleepiness). Further, remote temperature sensors may sense a temperature of the entire body, as well as regional temperature indications. Other sensors capable of detecting a relevant body condition without contact with the body (e.g., ambient) as known in the art may be substituted therefor, or used in conjunction with, any of the sensing devices disclosed herein.

Additionally, signal 515 may be a signal that is sensed by an external sensor that does contact the body (e.g., thermometer indicative of body temperature, or blood pressure signal representative of the first user's blood pressure which may be used to identify the first user's anxiety level). For example but not by way of limitation, the external sensor that contacts the body may include, but is not limited to, a stand-alone sensor, a sensor incorporated into other clothing or other accessory that directly or indirectly contacts the body (e.g., clothing, hat, belt, glasses, shoes, wristwatch, jewelry), as would be understood by those skilled in the art.

Further, signal 520 may be a signal that is representative of internal (e.g., intravenous) measurements, such as blood chemistry, etc., from the first user, which may be used to identify any foreign substances or identify the first user's level of impairment. For example, but not by way of limitation, such a signal may be derived from a device capable of such measurement (e.g., blood monitor), as would be understood by those skilled in the art.

As discussed above, the one or more signals 510, 515, 520 representative of biometric information measured during content generation may associated with content generated by the first user and provided to the service provider with the generated content in some implementations. The signals 510, 515, 520 may be used by a physiological understanding model 525 that may be used to identify and determine the first user's physical condition at the time of content generation. For example, the model 525 may be used to determine that the first user is sleepy or not thinking clearly based on the brain waves signal 510. Further, the model 525 may additionally or alternatively be used to determine that the first user is nervous or anxious based on the blood pressure signal 515. Further, the model 525 may additionally or alternatively be used to determine that the first user is impaired (e.g., chemical toxin) based on the intravenous measurements signal 520.

Based on the signals 510, 515, 520 provided, the first user's physical condition 530 may be determined using the model 525. The determined physical condition 530 may be compared to a threshold physical condition in 415 of process 400 of FIG. 4 discussed above to determine whether to forward content to an authorizer or provide content to one or more second user(s) if the first user has elected to enable the filtering functionality.

In some examples, process 300, 400, 500 may be implemented with different, fewer, or more blocks. Process 300, 400, 500 may be implemented as computer executable instructions, which can be stored on a medium, loaded onto one or more processors of one or more computing devices, and executed as a computer-implemented method.

Figure 6:
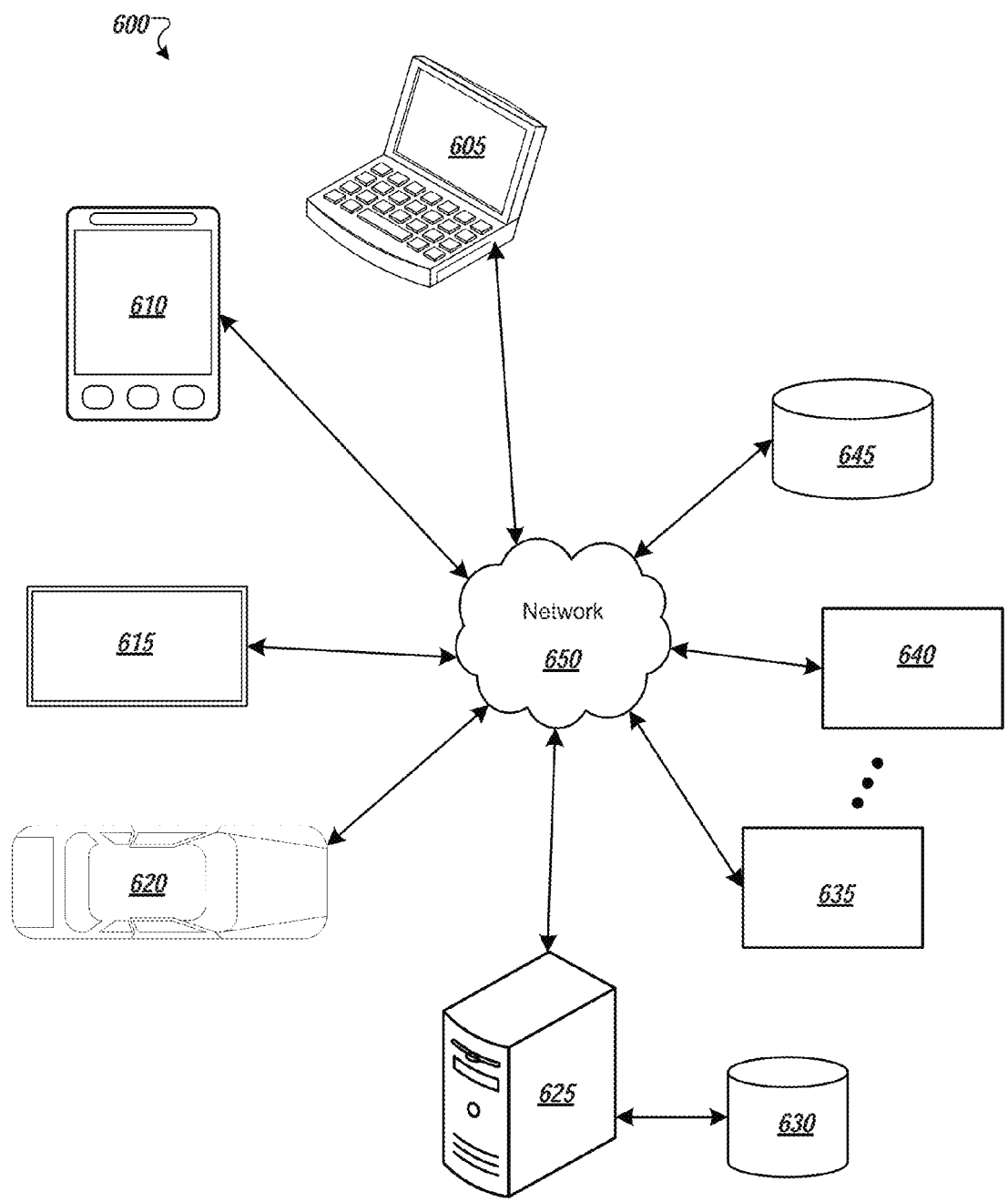
FIG. 6 shows an example environment suitable for some example implementations.

FIG. 6 shows an example environment suitable for some example implementations. Environment 600 includes devices 605-645, and each is communicatively connected to at least one other device via, for example, network 660 (e.g., by wired and/or wireless connections). Some devices may be communicatively connected to one or more storage devices 630 and 645.

An example of one or more devices 605-645 may be computing device 705 described below in FIG. 7. Devices 605-645 may include, but are not limited to, a computer 605 (e.g., a laptop computing device), a mobile device 610 (e.g., smartphone or tablet), a television 615, a device associated with a vehicle 620, a server computer 625, computing devices 635-640, storage devices 630 and 645.

In some implementations, devices 605-620 may be considered user devices (e.g., devices used by users to access services and/or issue requests, such as on a social network). Devices 625-645 may be devices associated with service providers (e.g., used by service providers to provide services and/or store data, such as webpages, text, text portions, images, image portions, audios, audio segments, videos, video segments, and/or information thereabout).

For example, a first user (e.g., Alice) may create, generate and/or edit content or a webpage using user device 605 or 610 on a social network supported by one or more devices 625-645. Additionally, an authorizer (e.g. Bob) may review, authorize, and/or edit the content, if forwarded to the Authorizer, user another device 605 or 610 on a social network supported by one or more devices 625-645. Further, a recipient (e.g., Carl) may access and/or view content generated by Alice and approved by Bob using device 605, 610, 615 or 620.

Figure 7:
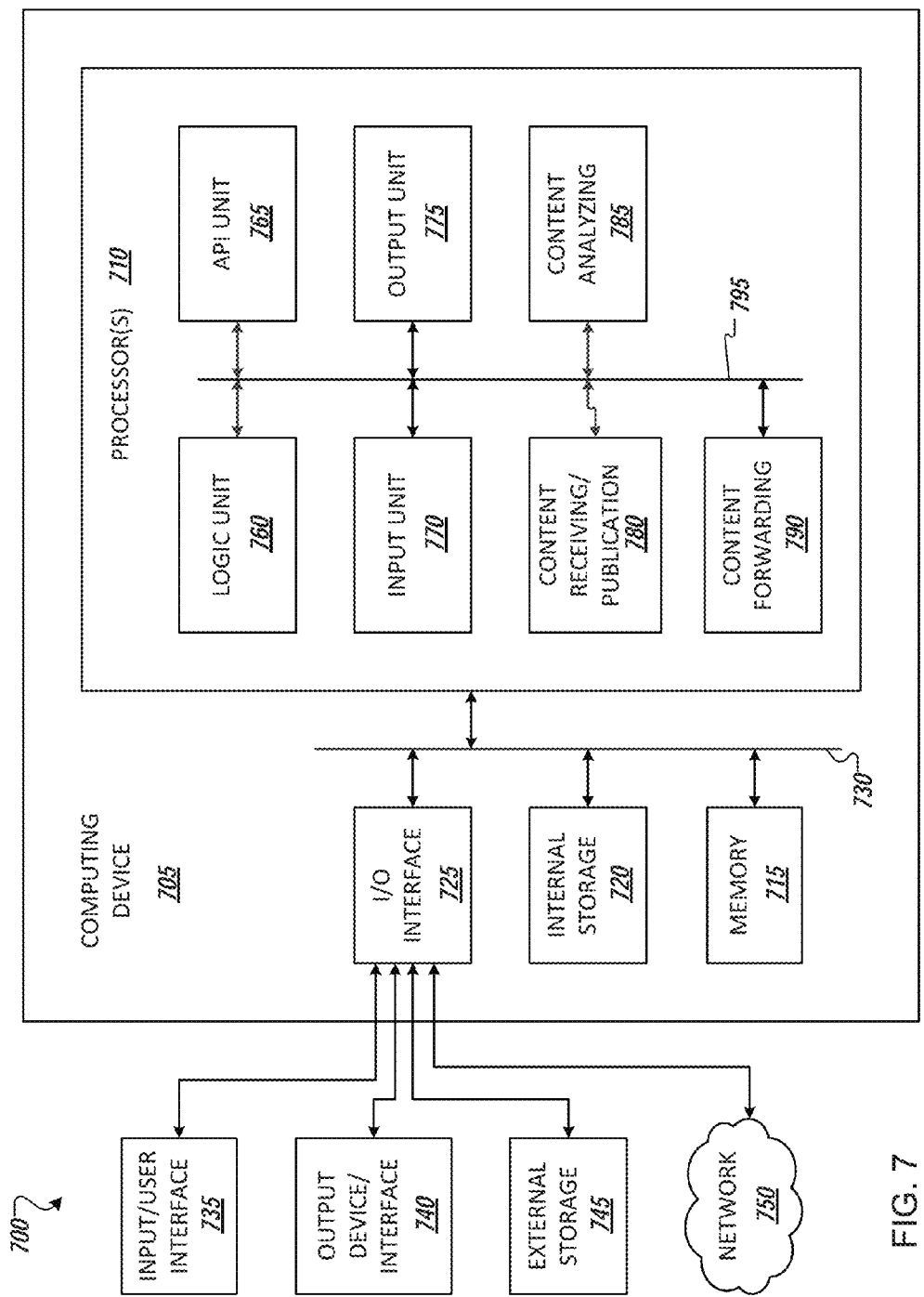
FIG. 7 shows an example computing environment with an example computing device suitable for use in some example implementations.

FIG. 7 shows an example computing environment with an example computing device suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like).

Additionally, the user input/user interface 735 may also include biometric sensors (e.g. an electroencephalogram (EEG), sphygmomanometer (blood pressure meter), blood chemistry analysis sensor, etc.) configured to capture a user's biometric information during content generation.

Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 605.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, content receiving/publication unit 780, content analyzing 785, content forwarding unit 790, and inter-unit communication mechanism 795 for the different units to communicate with each other, with the OS, and with other applications (not shown). For example, content receiving/publication unit 780, content analyzing 785, and content forwarding unit 790 may implement one or more processes shown in FIGS. 3-6. The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775, content receiving/publication unit 780, content analyzing 785, and content forwarding unit 790). For example, the content receiving/publication unit may forward received content to the content analyzing unit 785 after the input unit 770 has detected a user generated content and communicated the user content to the content receiving/publication unit 780. The content analyzing unit 785 may analyze the received user content to determine whether review of the user content by an authorizer is needed. If the content analyzing unit 785 determines that review by an authorizer is needed, the content analyzing unit 785 may provide the user content to the content forwarding unit 790. The content forwarding unit 790 forwards the user content to the proper authorizer and waits for a response. When an authorization is received by the content forwarding unit 790, or a certain amount of time has elapsed in some implementations, the content forwarding unit 790 may instruct the content receiving/publication unit 780 to proceed with publishing or distributing the content to other users.

In some instances, logic unit 760 may be configured to control the information flow among the units and direct the services provided by API unit 765, input unit 770, output unit 775, content receiving/publication unit 780, content analyzing 785, and content forwarding unit 790 in some example implementations described above. For example, the flow of one or more processes or implementations may be controlled by logic unit 760 alone or in conjunction with API unit 765.

In situations in which the systems discussed here collect personal information about users, or may make use of personal information, the users are provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

As used herein, a service provider may be any entity that stores user accounts and/or data or is likely implementing similar services. For example, cloud based service providers (e.g., providing computing and/or storage) may implement at least some of the example implementations described herein to allow users to control access to their accounts and content.

As used herein, the terms "account," "data" associated with an account, or "content" associated with an account refer to information and data of or about the user, related to or associated with the user, generated by or for the user, and/or for communicating with or providing service to the user. An account and/or data or content associated with the account may be associated with a website, product, service, online service, or application. The term "application" includes, but is not limited to, software (e.g., a non-transitory computer readable medium having instructions executable by a processor), which is online (e.g., accessible by communication protocol and structure, such as the Internet or other communication network). The application may be embodied in the environment or structure described below with respect to FIG. 6.

As used herein, the term "website" or "web site" or "site" refers to a set of web pages for providing or supporting related services. A website can be hosted on at least one computing device (e.g., a system, server, web server, application server, client, or any label) accessible via a network or connection (wired and/or wireless). A website can be accessed and/or supported using at least one top-level Uniform Resource Locator (URL, e.g., "abc.gov," "123.org," "zxc.com," "bestads.com," "virtualbank.com," and the like). A website can be operated and/or supported by one or more business entities. For example, ZXC Corporation may operate the website "zxc.com" that includes web pages, content, and/or services from "zxc.bestads.com" (e.g., advertisement services provided by another firm) and "virtualbank.com/zxc-payment-services" (e.g., financial services provided by a financial institution).

As used herein, the terms "product," "service," "online service," or "application" refer to any information, communication, infrastructure, organization, or the like provided by one or more providers to at least one user. Examples of products, services, or applications may include, but are not limited to, forums, online platforms, bulletin boards, social networks, websites, sites, chat rooms, email communication, image sharing sites, data sharing platforms, video sharing sites, online searching, data storage, cloud storage, software, tax preparation and filing, online banking, online investment management, and the like. Products, services, or applications may be provided on any device ranging from a mobile device (e.g., smartphone application or "apps"), to a semi-mobile device (e.g., a laptop), and to a non-mobile device (e.g., a kiosk). A product, service, or application may communicate to a provider or another product, service, or application using a wired or wireless connection.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method for providing content by a first user, the method comprising:
receiving, by one or more computing devices, content from the first user;
analyzing context data associated with the content received from the first user;
providing the content received from the first user to an authorizer based on a result of the analyzing the context data associated with the content; and
providing the content of the first user to a second user in response to receiving an authorization from the authorizer, wherein a user-generated rule determines that the content matches a keyword or previously identified subject matter and that the content is to be provided to an authorizer, and further determines an identity of the authorizer based on a category of the content, and further wherein the user-generated rule is suspended or terminated in response to an override command received from the first user so that the content is provided from the first user to the second user without receiving the authorization from the authorizer.

2. The method of claim 1, further comprising forwarding the content received by the first user to the first user based on receiving a reply from the authorizer indicating providing of the content should not be authorized.

3. The method of claim 1, wherein the analyzing the context data comprises determining whether the content includes subject matter data previously identified as requiring authorization.

4. The method of claim 1, wherein the context data associated with the content comprises a time that the content was received from the first user, and a biological condition of the first user at the time that the content was received from the first user.

5. The method of claim 1, wherein the context data comprises at least one of a measured biometric condition, a time, a geographical location, and a semantic location of the first user at the time that the content was received from the user.

6. The method of claim 1, wherein the context data comprises data associated with one or more biological conditions of the first user at a time that the content was received from the first user, and the content is provided to the authorizer based on the one or more biological conditions being achieved.

7. The method of claim 6, wherein the data associated with the one or more biological conditions of the first user includes at least one of respiratory information, cardiac information, brain activity information, and blood chemistry information.

8. The method of claim 7, wherein the providing the content to the authorizer based on the analyzing comprises forwarding the content to the authorizer based on a determination that the data associated with one or more biological conditions of the first user indicates a physical condition of the first user does not exceed a threshold.

9. A non-transitory computer readable medium having stored therein computer executable instructions for:
receiving, by one or more computing devices, content from the first user;
analyzing context data associated with the content received from the first user;
providing the content received from the first user to an authorizer based on a result of the analyzing the context data associated with the content; and
providing the content of the first user to a second user in response to receiving an authorization from the authorizer, wherein a user-generated rule determines that the content matches a keyword or previously identified subject matter and that the content is to be provided to an authorizer, and further determines an identity of the authorizer based on a category of the content, and further wherein the user-generated rule is suspended or terminated in response to an override command received from the first user so that the content is provided from the first user to the second user without receiving the authorization from the authorizer.

10. The computer readable medium of claim 9, further comprising forwarding the content received by the first user to the first user based on receiving a reply from the authorizer indicating providing of the content should not be authorized.

11. The computer readable medium of claim 9, wherein the analyzing the context data comprises determining whether the content includes subject matter data previously identified as requiring authorization.

12. The computer readable medium of claim 9, wherein the context data comprises data associated with one or more biological conditions of the first user at a time that the content was received from the first user, and the content is provided to the authorizer based on the one or more biological conditions being achieved.

13. The computer readable medium of claim 12, wherein the data associated with the one or more biological conditions of the first user includes at least one of respiratory information, cardiac information, brain activity information, and blood chemistry information.

14. The computer readable medium of claim 13, wherein the providing the content to the authorizer based on the analyzing comprises forwarding the content to the authorizer based on a determination that the data associated with one or more biological conditions of the first user indicates a physical condition of the first user does not exceed a threshold.

15. At least one computing device comprising storage and a processor configured to perform:
  receiving content from the first user;
  analyzing context data associated with the content received from the first user;
  providing the content received from the first user to an authorizer based on a result of the analyzing the context data associated with the content; and
  providing the content of the first user to a second user in response to receiving an authorization from the authorizer, wherein a user-generated rule determines that the content matches a keyword or previously identified subject matter and that the content is to be provided to an authorizer, and further determines an identity of the authorizer based on a category of the content, and further wherein the user-generated rule is suspended or terminated in response to an override command received from the first user so that the content is provided from the first user to the second user without receiving the authorization from the authorizer.

16. The at least one computing device of claim 15, further comprising forwarding the content received by the first user to the first user based on receiving a reply from the authorizer indicating providing of the content should not be authorized.

17. The at least one computing device of claim 15, wherein the analyzing the context data comprises determining whether the content includes subject matter data previously identified as requiring authorization.

18. The at least one computing device of claim 15, wherein the context data comprises data associated with one or more biological conditions of the first user at a time that the content was received from the first user, and the content is provided to the authorizer based on the one or more biological conditions being achieved.

19. The at least one computing device of claim 18, wherein the data associated with the one or more biological conditions of the first user includes at least one of respiratory information, cardiac information, brain activity information, and blood chemistry information.

20. The at least one computing device of claim 19, wherein the providing the content to the authorizer based on the analyzing comprises forwarding the content to the authorizer based on a determination that the data associated with one or more biological conditions of the first user indicates a physical condition of the first user does not exceed a threshold.

* * * * *